US005635393A

United States Patent [19]
Bhatnagar et al.

[11] Patent Number: 5,635,393
[45] Date of Patent: Jun. 3, 1997

[54] METHOD FOR DECHLORINATING POLYCHLORINATED BIPHENYLS AND GRANULES FOR USE IN METHOD

[76] Inventors: Lakshmi Bhatnagar, 1722 Country View Dr., Okemos, Mich. 48864; Wei-Min Wu, 2900 Beau Jardin, Apt. 201, Lansing, Mich. 48910-5842; Murugiah R. Natarajan, 801-202 Cherry Lane Apartments, Michigan State University, East Lansing, Mich. 48823; Henry Y. Wang, 1215 Bardstown Trail, Ann Arbor, Mich. 48105; Mahendra K. Jain, 3950 Jonquil La., Okemos, Mich. 48864

[21] Appl. No.: 466,004

[22] Filed: Jun. 6, 1995

Related U.S. Application Data

[63] Continuation-in-part of Ser. No. 222,585, Apr. 4, 1994, abandoned.

[51] Int. Cl.⁶ .................................................. C02F 11/02
[52] U.S. Cl. ........................................ 435/262.5; 435/262
[58] Field of Search ................................ 435/262.5, 262

[56] References Cited

U.S. PATENT DOCUMENTS 5,464,771   11/1995   Bryant et al. .................... 435/262.5

*Primary Examiner*—Helen Pratt
*Attorney, Agent, or Firm*—Quarles & Brady

[57] ABSTRACT

The present invention relates to a biological method for dechlorinating polychlorinated biphenyls (PCBs) by inoculating a polychlorinated biphenyl containing sample with PCB dechlorinating anaerobic methanogenic granules. The granules are made by coculturing particles of a PCP-dechlorinating methanogenic microbial consortia and a PCB-dechlorinating microorganism under anaerobic conditions in an upflow anaerobic sludge blanket (USAB) reactor.

5 Claims, 1 Drawing Sheet

METHOD FOR DECHLORINATING POLYCHLORINATED BIPHENYLS AND GRANULES FOR USE IN METHOD

RELATED CASE

The present application is a continuation-in-part of U.S. Ser. No. 08/222,585 filed Apr. 4, 1994, now abandoned.

TECHNICAL FIELD

The present invention generally relates to a biological method of dechlorinating polychlorinated biphenyls (PCBs). More particularly, it relates to a method of dechlorinating PCB containing materials which employs anaerobic PCB-dechlorinating culturable methanogenic microbial consortia. It also relates to new PCB-dechlorinating anaerobic methanogenic granules which are made from disrupted pentachlorophenol (PCP)-degrading granules by adding a microbiological consortia capable of completely dechlorinating PCBs to the disrupted granules and forming new granules.

BACKGROUND OF THE INVENTION

Polychlorinated biphenyls (PCBs) are a family of compounds that contain a biphenyl nucleus with multiple chlorine substitutions. Approximately 209 different chlorinated biphenyls are possible. This is the result of the ten positions available for chlorine substitution on the biphenyl ring structure. In PCB mixtures, each of the ten may be occupied by either chlorine or hydrogen. PCBs were manufactured by Monsanto between 1929 and 1978 under the trade name Aroclor. Various complex mixtures of PCBs were manufactured and typically differed only in the percent of chlorine by weight. In most cases, the PCB compounds were identified with a numerical designation beginning with the number 12. The number 12 signified the 12 carbons of the biphenyl ring. The designation was typically completed with two additional numbers indicating the percentage by weight of chlorine present. For example, Aroclor 1254 represents a biphenyl ring structure wherein number 54 represents 54% chlorine by weight. Aroclor 1242 represents a biphenyl ring structure wherein number 42 represents 42% chlorine by weight.

During the time in which they were manufactured, PCBs were industrially important organic chemicals with diverse applications. These compounds were used as coolants and dielectric fluids in transformers and in capacitors, heat transfer fluids, coatings for wood products, flame retardants and chlorinated pesticides.

Unfortunately, PCBs are extremely stable and difficult to degrade. The widespread distribution during the forty-five years of their manufacture coupled with their stability has lead to an accumulation of PCBs in the environment.

Because of the environmental problems associated with PCBs, manufacturing, distribution and use of PCBs have essentially been banned in the United States since 1976. Although it has been years since the production of PCBs ceased in the United States, these chemicals are still widely distributed in the environment, especially in the soil and sediments.

In several regions, the presence of PCBs in the soil and sediments present a particular problem because PCBs tend to bioaccumulate. For example, in the Great Lakes region, PCBs have been found in fish and fish products. In addition, recently the distribution of PCBs in breast milk of Canadian women has been reported.

Due to their stability and associated toxicity, PCBs are environmental pollutants which are of major concern. The clean-up of Sites contaminated with PCBs presents a major challenge. Several biological methods have been explored as potential means for reducing the presence of PCBs in the environment.

Generally aerobic bacteria degrade only biphenyl and lower chlorinated PCBs. That is, aerobic bacteria degrade biphenyl and biphenyl rings having one to four chlorine substitutes i.e., mono- to tetra-chlorine substitutes. A few aerobic microbial species can dechlorinate and mineralize defined congeners of PCBs containing up to four chlorines. See, Harkness, et al. "In Situ Stimulation of Aerobic PCB Biodegradation In Hudson River Sediments", Science, Vol. 259, Jan. 22, 1993, pp. 503–507 and Abramowicz, "Aerobic and Anaerobic Biodegradation of PCBs: A Review", Critical Reviews In Biotechnology, Vol. 10, Issue 3, pp. 241–251 (1990). Aerobic organisms that have been used in an attempt to dechlorinate PCBs include common soil bacteria and complex fungi.

Dechlorination of more highly chlorinated PCBs, that is PCBs with up to 10 chlorine substitutions have been observed under anaerobic conditions. Hence, the anaerobic processes look very attractive for bioremediation of PCB-contaminated soils and sediments and in particular for the dechlorination of highly chlorinated PCBs. See, for example, Quensen, et al., "Dechlorination of Four Commercial Polychlorinated Biphenyl Mixtures (Aroclors) by Anaerobic Microorganisms From Sediments", Applied and Environmental Microbiology, August, 1990 p. 2360–2369.

Quensen, et al. used sediments containing anaerobic microorganisms obtained from various sites to dechlorinated PCBs in solution. However, the microorganisms could not be cultivated without sediments as pure or mixed cultures and the addition of large amounts of sediment to lakes and rivers containing PCB contaminated sediment is not a practical solution.

A two-step process involving both anaerobic and aerobic treatment has also been suggested in order to dechlorinate PCBs. This process involves the use of anaerobic and aerobic steps in sequence to dechlorinate highly chlorinated PCBs to biphenyls.

In the past, complete dechlorination of PCBs has been difficult to achieve. In fact, although selective dechlorination of the meta and para chlorines of PCBs has been accomplished by various mechanisms and reported in numerous instances, ortho dechlorination of PCBs has been generally unsuccessful. However, ortho dechlorination of a PCB in solution using slurries of sediment containing bacteria has been reported by Van Dort and Bedard, "Reductive ortho and meta Dechlorination of a Polychlorinated Biphenyl Congener by Anaerobic Microorganisms", Applied and Environmental Microbiology, May, 1991, p. 1576–1578. Obviously, the use of slurries of sediment containing bacteria to treat lake and river sediment containing PCBs has disadvantages over the use of concentrated consortia of such bacteria.

Presently, there is no completely effective method for treatment of PCB-contaminated sediments and soils. There is certainly no effective in situ method of treating contaminated sediments which results in a complete dechlorination of the highly chlorinated biphenyl ring.

Granules containing microorganisms have been used to treat waste. The advantages of using such granules are that they do not contain any amount of sediments, they are easy to handle, they are stable and they usually stay where they are placed.

In 1991, the use of granules for treatment of waste that contained pentachlorophenol (PCP), trichloroethylene (TCE) and perchloroethylene (PCE) was described in Bhatnagar et al., "Design and Function of Biomethanation Granules for Hazardous Waste Treatment", In Proceedings, International Symposium on Environmental Biotechnology, p. 1–10, Royal Flemish Society of Engineers, Belgium, (1991). The design and use of a dechlorinating biomethanation (DSB) consortia for treatment of pentachlorophenol (PCP) was described. For treatment of PCP, the biomethanation (SB) granules-were modified by adding mixed acidogenic and methanogenic cultures enriched on PCP. These modified cultures were found to satisfactorily degrade pentachlorophenol (PCP) See Wu et al., "Performance of Anaerobic Granules for Degradation of Pentachlorophenol", Applied Environmental Microbiology, vol. 59, 1993, pp. 389–397. However, subsequent use of those same granules in an attempt to degrade polychlorinated biphenyls (PCBs) proved disappointing. Although some dechlorination occurred, it was far from complete.

It would be advantageous to have granules that contain a consortium of microorganisms that can dechlorinate PCBs and methods of using such granules to dechlorinate PCBs in the sediment of rivers and lakes in situ.

SUMMARY OF THE INVENTION

The present invention provides a method for dechlorinating PCBs in aqueous media, such as soil or river or lake sediments, by utilizing granules containing a consortium of anaerobic PCB-dechlorinating microorganisms. It has been found that these PCB-dechlorinating granules not only eliminate chlorine from the meta and para positions of the biphenyl ring but, they remove chlorine from the ortho position as well. Indeed, these granules have been found to provide an effective means of completely dechlorinating PCBs.

The method of the present invention for dechlorinating polychlorinated biphenyls comprises inoculating a polychlorinated biphenyl containing medium, such as soil or lake or river sediment, with novel anaerobic PCB-dechlorinating granules under anaerobic conditions at a temperature of between about 4° C. to about 35° C., preferably between 10° C. and 30° C., to obtain the complete removal of chlorines from all the three positions i.e. meta, para, and ortho of the polychlorinated biphenyl in the medium.

The anaerobic PCB-dechlorinating methanogenic granules of the present invention contain self-immobilized anaerobic microbial consortia. The microbial cultures form a granular structure generally with a size ranging between 0.1 and 5.0 mm. Unlike powders and extremely small particles, the granules, especially those about 0.5 mm to 5 mm in size, usually stay where they are put, they are normally stable, and they can grow and be maintained for long period of time. As a result, they provide a superior product for treating soil or river and lake sediments in situ.

The present invention also relates to a method of making such granules by disrupting anaerobic PCP-degrading granules into less than about 0.1 mm in size and coculturing them with PCB-dechlorinating microorganisms to form the desired granules.

The advantage of the present invention will be readily appreciated as the same becomes better understood by reference to the following detailed description when considered in connection with the accompanying drawings.

DETAILED DESCRIPTION OF THE INVENTION

Figure 1:
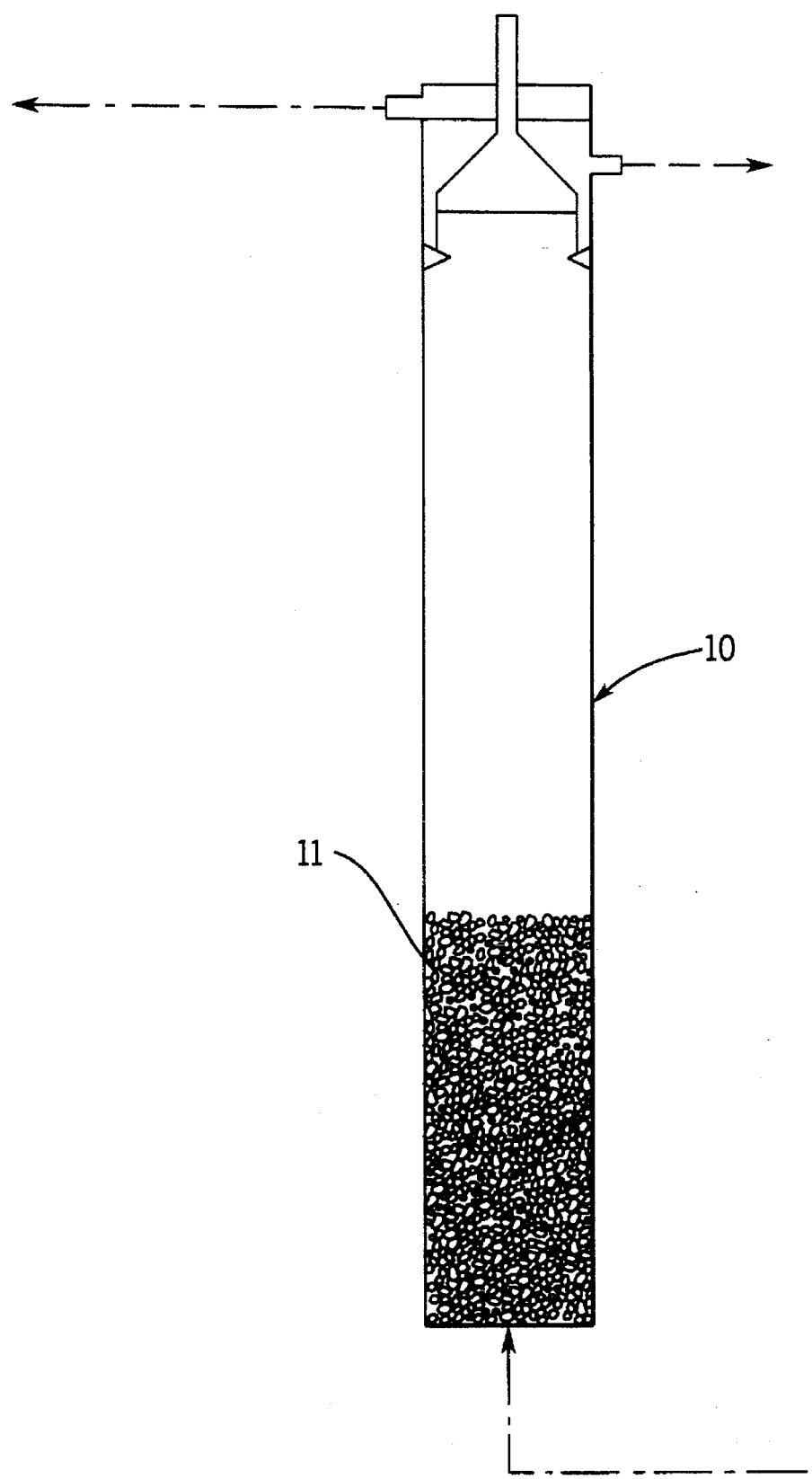
FIG. 1 is a schematic elevational view of an Upflow Anaerobic Sludge Blanket (UASB) reactor.

In general, the present invention provides a method for making novel granules containing anaerobic PCB-dechlorinating microorganisms and the use of the granules in a method for dechlorinating PCBs, as well as, defined PCB congeners.

The novel anaerobic, PCB-dechlorinating granules of the present invention are preferably made in an Upflow Anaerobic Sludge Blanket (UASB) reactor of the type shown in FIG. 1.

Generally, as seen in FIG. 1, an UASB reactor 10 consists of a biological reaction zone and a sedimentation zone 11. In the reaction zone 11, the organic compounds in influent are converted to methane and $CO_2$ by the microorganisms as they pass through the sludge bed. The gas produced and sludge buoyed by entrapped or attached gas bubbles are separated from liquid effluent via a gas-solid-liquid separator installed at the top of the reactor 10. Over time, the anaerobic sludge normally develops a granular form in an UASB reactor. The term "anaerobic" as used herein is intended to mean conditions under which anaerobic bacteria can survive and multiply.

In the method of making the anaerobic PCB-dechlorinating granules, first PCP-dechlorinating granules are disrupted to form small granular particles of about 0.1 mm or less in size and then the particles are cocultured in a UASB reactor with microorganisms that can dechlorinate PCBs which are obtained from anoxic contaminated sediment to form the desired granules.

The granules containing PCP-dechlorinating biomethanation microorganisms are made by coculturing the biomethanation granules of L. Bhatnagar et al, supra in an enriched pentachlorophenol (PCP) mineralizing culture as described by Wu, et al. "Performance of Anaerobic Granules for Degradation of Pentachlorophenol" in Applied and Environmental Microbiology pps. 389–397 (1993), which is incorporated by reference herein. When tested these PCP-dechlorinating biomethanation granules did little dechlorination of PCBs. This was not surprising since PCBs are more complex than pentachlorophenols (PCPs).

Bacteria from anoxic contaminated sediments which dechlorinate PCBs, were enriched. Over a period of several months, the vials containing inocula from sediment were incubated at 35° C. and spiked with PCBs (such as Aroclor 1242 or Aroclor 1254) periodically to develop an anaerobic consortium that will dechlorinate PCBs. The consortium was then transferred into an anaerobic vial that contained a homologous medium composed of mineral salts, PCBs, methanol, and salts of acetic, propionic and butyric acids. The PCBs were added to provide selection pressure to develop PCB-dechlorinating cultures. Transfers from a growing culture to another vial containing fresh media were preferably made after every 4–6 weeks. This finally resulted in an enriched microbial consortium that could dechlorinate Aroclor mixtures, PCB-defined congeners and their products.

While the preferred PCB dechlorinating bacteria were obtained from sediment from a waste facility in Michigan, they also can be obtained from other sediments such as those described by Van Dort, et al supra.

In the preferred embodiment of the method, the PCP-dechlorinating granules were disrupted into small granular particles (less than 0.1 mm) by passing them through a glass syringe and 18 gauge needle.

In making the PCB-dechlorinating anaerobic methanogenic granules, the PCB-dechlorinating microbial consortia are added to a UASB reactor that contains the disrupted PCP-dechlorinating granules. The reactor is operated at 35° C. and closed loop recycling is used so as to prevent loss of PCB-dechlorinating cultures. The reactor is fed with a medium containing methanol, and a carbon and energy source to the mixed microbial cultures.

The reactor is operated at mesophilic conditions (35° C., pH 7.0) and with an organic loading rate of >5.0 g COD/g dry weight per day until the granules are obtained.

The media containing the suitable carbon and energy source for the mixture of bacteria in the granules is: acetic acid, 100 mmol/l; propionic acid, 50 mmol/l; butyric acid, 50 mmol/l; NaOH, 40 g/l; NaCl, 1.0 g/l; $MgCl_2$, 0.2 g/l; $CaCl_2$, 0.1 g/l; $NH_4Cl$, 1.0 g/l; $KH_2PO_4$, 30.0 mmol/l; $FeSO_4$, 0.05 mmol/l, $Na_2SO_4$, 0.1 mmol/l; and, $Na_2S$, 0.15 mmol/l.

Pressure on dechlorinating activity of the cultures is maintained by providing in the medium chlorinated aromatic compounds, such as chlorophenols. In about 4 weeks, the disrupted granules and the PCB-dechlorinating cultures form the desired new granules. Since these granules are developed anaerobically and the granules produce methane and dechlorinate PCBs, they are called anaerobic PCB-dechlorinating methanogenic granules. These granules were deposited on Sep. 29, 1994 under the terms of the Budapest treaty with the American Type Culture Collection, 12301 Parklawn Drive, Rockville, Md., 20852, U.S.A. (ATCC No. 55616). All restrictions imposed by the depositor on the availability to the public of the deposited material will be irrevocably removed upon the granting of a patent.

The preferred granules have the following characteristics:

(a) Size—approximately 0.5 to 5 mm, average size of 1 to 2 mm is optimum.

(b) Color—Gray to pink in color, change to black in presence of sulfate.

(c) Composition—In addition to microorganisms, contain extracellular polymeric material produced by the organisms. This material helps to self immobilize the organisms, including the PCB dechlorinating organisms. The granules do not contain sediment.

(d) Viability—reproducible, they can grow in UASB reactor and survive in a lake or river environment.

(e) Stability—stable at near neutral pH's.

(f) Temperature Range—Active from 4° C. to 35° C.; good activity between 10° C. and 30° C.

(g) Culturability—can be mass produced.

The anaerobic PCB-dechlorinating methanogenic granules of the present invention have the capability of completely dechlorinating PCBs. This capability is demonstrated in experiments which are discussed below.

EXPERIMENTAL METHODS, TECHNIQUES AND RESULTS

Experimental procedures showing the dechlorination of PCBs generally require the extraction of PCBs from an aqueous sample. The first section as given below describes in detail the extraction process used to isolate PCBs. After the PCBs are extracted, the extracted material is analyzed using gas chromatography and the results tabulated. Further experimental results demonstrate the capability of granules to dechlorinate PCBs in the presence and absence of sediments.

The procedure utilized for analysis of the extracted PCB samples using a gas chromatograph is described in detail in Section ii as given. The Tabulation of data is described in Section iii. Finally, the experiments which utilize the procedures set forth in Sections i–iii, are described in Section iv and v.

i. Extraction of PCBs from Queous Samples

Both Reverse Phase-Solid Phase (RP-SP) and liquid phase (LP) extraction techniques were used to extract PCBs from aqueous samples containing anaerobic consortia and sediments. The protocol for RP-SP extraction was as follows: RP-SP columns were prepared by filling an empty polypropylene tube obtained from Alltech, Deerfield, Ill. with approximately 200 mg of a sorbent which comprised $C_{18}$ chemically bonded silica from Analytichem, Harbor City, Calif. The sorbent was packed in between two polypropylene frits. One ml of aqueous sample containing PCBs was added to 70 ml of 25% KCl and the mixture was passed through the RP-SP column fitted to a manifold vacuum chamber. (J&W Scientific, Folsom, Calif.). Adsorbed PCBs were eluted with four 250 ul aliquots of iso-octane. The elutent was then run through a second column containing anhydrous sodium sulfate for water removal. The final sample, adjusted to 1 ml with isooctane, was transferred to a 1.5 ml GC-vial for analysis. Octachloronapthalene (1.6 ppm) in iso-octane was used as an internal standard and was extracted with the samples.

Methodology for liquid phase (LP) extraction was developed as described in Quensen et al. (1990). (See, "Dechlorination of Four Commercial Polychlorinated Biphenyl Mixtures (Aroclors) by Anaerobic Microorganism from Sediments", Applied and Environmental Microbiology, vol. 56, pp. 2360–2369, 1990) Desired volume of samples were extracted by shaking once with 10 ml of acetone containing 1.6 ppm of octachloronapthalene as the internal standard and subsequently twice with 10 ml hexane-acetone (9:1). The solvent extracts were combined and the acetone was extracted with 2% NaCl in deionized water. The remaining hexane extract was extracted with 2 to 4 ml of concentrated sulfuric acid, rinsed again with 2% NaCl in deionized water, and then dried over anhydrous $Na_2SO_4$. Further clean up was performed on Florisil/copper powder column. These columns were prepared by packing approximately 4 parts of 60/100-mesh Florisil and 1 part of 60-mesh copper powder (to remove sulfur) in a Pasteur pipette. The copper was rinsed with $H_2SO_4$, deionized water, and acetone and dried under vacuum before use. The sample was eluted from the column with hexane, and the final volume was adjusted according to calibration level and analysis using GC-ECD. The peak identification chart was prepared using the standard mixtures of 2-CB, 4-CB, 2,3,6-TCB, 2,3,4,6-TeCB, 2,3,4,5,6-PeCB, Arolcor 1242 and 1254 (Table 1). Dechlorination profiles and pattern of PCBs were determined based on the calibration chart.

TABLE 1

| PCB Peak Identification Chart and Average Number of Chlorines for Individual PEAKS | | | |
| --- | --- | --- | --- |
| Peak | | Av. Chlorine Biphenyl Molecule | |
| No. | Congener(s) | ortho | meta-para |
| 1 | 2 | 1 | 0 |
| 2 | 4 | 0 | 1 |

TABLE 1-continued

PCB Peak Identification Chart and Average Number
of Chlorines for Individual
PEAKS

| Peak No. | Congener(s) | Av. Chlorine Biphenyl Molecule ortho | Av. Chlorine Biphenyl Molecule meta-para |
|---|---|---|---|
| 3 | 2-2\2,6 | 2 | 0 |
| 4 | 2,4\2,5 | 1 | 1 |
| 5 | 2,3' | 1 | 1 |
| 6 | 2-4\2,3 | 1 | 1 |
| 7 | 2,6-2' | 3 | 0 |
| 8 | 2,4,6 | 2 | 1 |
| 9 | 2,5-2\4-4' | 1.51 | 1.24 |
| 10 | 2,6-3' | 2 | 1 |
| 11 | 2,3-2\2,6-4' | 2 | 1 |
| 12 | 3,5-2'(2,6-2'6') | 1 | 2 |
| 13 | 2,4,5 | 1 | 2 |
| 14 | 2,5-3' | 1 | 2 |
| 15 | 2,4-3' | 1 | 2 |
| 16 | 2,4-4'(2,4-6-2') | 1 | 2 |
| 17 | 3,4-2'\2,3,4\2,3-3' | 1.12 | 1.94 |
| 18 | 2,3-4'(2,4-2',6') | 1 | 2 |
| 19 | 2,3,6-2' | 3 | 1 |
| 20 | 2,5-2'5'\2,6-3',5' | 2 | 2 |
| 21 | 2,4-2',5' | 2 | 2 |
| 22 | 2,4-2',4' | 2 | 2 |
| 23 | 2,3,4,6 | 2 | 2 |
| 24 | 2,3-2',5' | 2 | 2 |
| 25 | 2,3-2',4'\2,3,6-3'\3,4-4' | 0.84 | 2.56 |
| 26 | 2,6-3',4'\2,3,4-2'\2,3,6-4' | 1.75 | 2.25 |
| 27 | 2,3-2',3' | 2 | 2 |
| 28 | 2,3-,5-3'\2,4,5-3'\2,4,6-2'4'\ 2,4,6-2',5' | 1.40 | 2.80 |
| 29 | 2,3-3',5'\2,3,5-4' | 1 | 3 |
| 30 | 2,4,5-4'(2,3,5-2',6') | 1 | 3 |
| 31 | 2,5-3',4'\3,4,5-2' | 1 | 3 |
| 32 | 2,3,6-2',5'\2,4,5-2',6\2,4-3',4' | 1.08 | 2.96 |
| 33 | 2,3,4-3'\2,3,6-2',4' | 2.90 | 2.05 |
| 34 | 2,3-3',4'\2,3,4-4' | 1 | 3 |
| 35 | (2,3,6-2',3'\2,3,5-2',5') | 1 | 3 |
| 36 | 2,4,5-2',5'\2,3,5-2',4' | 2 | 3 |
| 37 | 2,4,5-2',4' | 2 | 3 |
| 38 | 2,3,6-2',4',6'\2,3,5,6-3'\ | 2 | 3 |
| 39 | 2,4,6-3',4' | 2.67 | 2.33 |
| 39 | 2,3,4-2'5'\2,3,4,6-4'\ 2,3,5-3',5 | 1.67 | 3.33 |
| 40 | 2,3,4,5,6 | 2 | 3 |
| 41 | 3,4-3',4'\2,3,6-3'4' | 1.38 | 3.31 |
| 42 | 2,3,5,6-2',5' | 3 | 3 |
| 43 | 2,3,5-2',3',6'\3,4,5-2',5'\ 2,3,4,6-2',5' | 2.74 | 3.13 |
| 44 | 2,4,5-3',4'\2,3,6-2',4'5'\ 2,3,4,5-3' | 1.64 | 3.68 |
| 45 | 3,4,5-2'3'\2,3,4,6-2'3'\ 2,3,5-2',3',5' | 1.45 | 3.85 |
| 46 | 2,3,5-2',4',5'\2,3,4,6-3'5' | 2 | 4 |
| 47 | 2,4,5-2',4',5' | 2 | 4 |
| 48 | 2,3,4-2',3',6'\2,3,4-3',4' | 2.24 | 3.38 |
| 49 | 2,3,4,5-2',5' | 2 | 4 |
| 50 | 2,3,4,5-2',4' | 2 | 4 |
| 51 | 2,3,4-2',4'5' | 2 | 4 |
| 52 | 2,3,4,6-3',4' | 2 | 4 |
| 53 | 2,3,5,6-2',3',5' | 3 | 4 |
| 54 | 2,3,5,6-2',4',5'\2,3,4,5-2',4',6' | 3 | 4 |
| 55 | 2,4,5-3',4',5' | 1 | 5 |
| 56 | 2,3,4,5-2',3',6'\2,3,4,5,6-2',4' | 3 | 4 |
| 57 | 2,3,5,6-2',3',4' | 3 | 4 |
| 58 | 2,3,4,6-2',3',4'\2,3,4,5-3',4'\ 2,3,5,6-2',3',5',6 | 2.41 | 4.30 |
| 59 | 2,3,4,5,6-2',3'\2,3,4,6-2',3',5',6'\ 2,3,4,5,6-2',4',6' | 3.87 | 4 |
| 60 | 2,3,4,5-2',3',5'\2,3,4,5,6-3',5' | 2 | 5 |
| 61 | 2,3,4,5-2',4',5' | 2 | 5 |
| 62 | 2,3,5,6-3',4',5' | 2 | 5 |
| 63 | 2,3,4,5-2',3',4' | 2 | 5 |
| 64 | 2,3,4,5-2',3',4',6'\2,3,4,5,6-2',4',5' | 3 | 5 |

TABLE 1-continued

PCB Peak Identification Chart and Average Number
of Chlorines for Individual
PEAKS

| Peak No. | Congener(s) | Av. Chlorine Biphenyl Molecule ortho | Av. Chlorine Biphenyl Molecule meta-para |
|---|---|---|---|
| 65 | 2,3,4,5-3',4',5' | 1 | 6 |
| 66 | 2,3,4,5,6-2',3',4' | 3 | 5 |
| 67 | 2,3,4,5-2',3',4',5' | 2 | 6 |
| 68 | OCN Internal Standard | | | ii. GC Analysis of PCBs

PCB mixtures and the defined chlorobiphenyl congeners were analyzed by Gas Chromatography utilizing a Varian GC 3400. The gas chromatograph was equipped with 63Ni Electron Capture Detector (ECD), DB-5 mega bond capillary column measuring 25 m×0.53 mm and available from J&W Scientific as well as an autosampler. The temperature settings for the injections was at 280° C. and for the detector was at 325° C. Initial column temperature was set at 140° C. with an increase in temperature at the rate of 5° C./min up to 280° C. The final hold time at the end of temperature program was five minutes. The total run time was 29.5 min. Helium and nitrogen were used as carrier and make up gases at the flow rate of 10 ml and 20 ml/min, respectively. For identification and quantitation of peaks, PCB standard mixtures and defined congeners were analyzed using the same extraction and GC conditions.

The percent reduction of PCBs and dechlorination, compared to autoclaved (dead cells) controls was determined on the basis of the amount of PCBs in micro mole ($\mu$m) ratios.

iii. Development of Peak Identification Charts and Calibration Table for PCBs

PCB mixtures (Aroclor 1254 and 1242) and defined congeners were analyzed as described above. As a result, a detailed calibration table and protocols were developed for identification and quantitation of PCBs based on molar concentrations of PCB congener peaks using a mixture of 2-Chlorobiphenyl (2-CB), 4-Chlorobiphenyl (4-CB), 2,3,6-Trichlorobiphenyl (2,3,6-TCB), 2,4,6-Trichlorobiphenyl (2,4,6-TCB), 2,3,4,6-Tetrachlorobiphenyl (2,3,4,6-TeCB), 2,3,4,5,6-Pentachlorobiphenyl (2,3,4,5,6-PeCB), Aroclor 1242 and Aroclor 1254 as standard. Each peak in the chromatogram was identified as well as quantified based on the analysis of the standard mixture. The standard PCBs peak identification chart and average number of chlorines (ortho, meta and para) for each chromatographic peak was established as presented in Table 1, to determine the PCB dechlorination profiles.

iv. The Dechlorination of PCBs

The described anaerobic PCB-dechlorinating methanogenic granules (ATCC No. 55616) were incubated with Aroclor mixtures and a phosphate buffered basal medium at 30° C. for a total time of 16 weeks in an anaerobic serum vial. Aroclor, as stated above, is the trade name under which Monsanto manufactured PCBs. Two different concentrations of Aroclor were used. The first involved 40 parts per million of the Aroclor 1254. The second was 200 parts per million of Aroclor. Duplicate and/or triplicate samples were withdrawn at 8 week intervals for extraction and analysis of PCBs and dechlorination products as described by methods set forth above.

The amount of Aroclor 1254 was substantially reduced after 16 weeks of incubation. In fact, the total PCBs reduction was approximately 80%. Important to note here is this was a preferred dechlorination of higher chlorinated congeners and concurrent dechlorination of lightly chlorinated intermediates.

The gas chromatograms of Aroclor 1254 congeners after dechlorination by granules at different time intervals when compared to an Aroclor 1254 profile from a vial containing autoclaved granules showed extensive dechlorination with a loss of higher chlorinated congeners, and considerable changes in the lower chlorinated intermediates.

Similar dechlorination results were achieved when the anaerobic PCB-dechlorinating granules (ATCC No. 55616) were used to dechlorinate 200 parts per million (ppm) of Aroclor 1254.

v. Dechlorination Pattern and Rates

Dechlorination rates and pattern experiments also were conducted. These studies were conducted in serum vials containing a phosphate buffered mineral medium supplemented with methanol and glucose as substrate. To obtain the dechlorination pattern, two different defined PCB congeners i.e, 2,3,4,6-Tetrachlorobiphenyl (TeCB) and 2,3,4,5, 6-Pentachlorobiphenyl (PeCB) were used at the forty parts per million level. Anaerobic PCB-dechlorinating granules (ATCC No. 55616) at 10 grams dry weight per liter (approximately 1.5 grams of volatile suspended solids (VSS)/L) were added to the bottles and the bottles incubated at 30° C. Samples were withdrawn periodically and analyzed for respective residual PCB congeners. The experiment was conducted for 20 weeks. Nearly complete dechlorination of 2,3,4,6-TeCB was obtained at the end of the 20 week period. During this period, 2,3,4,6-tetrachlorobiphenyl was sequentially dechlorinated to 2,4,6-trichlorobiphenyl (TCB) which was further dechlorinated to 2,4 dichlorobiphenyl (DCB) and 2 chlorobiphenyl (CB) and finally to biphenyl. In a similar pattern, 2,3,4,5,6-PeCB was dechlorinated to lower chlorinated intermediates and finally to biphenyl. In both cases, biphenyl was accumulated as the end product.

The accumulation of biphenyl as an end product demonstrates the complete dechlorination of PCBs. Similar results of dechlorination of 2,3,4,6-tetrachlorobiphenyl were also obtained when the PCB-dechlorinating anaerobic methanogenic granules were disrupted to obtain suspended PCB-dechlorinating anaerobic microbial consortia.

Dechlorination rates for seven different defined PCB-congeners, such as 2-chlorobiphenyl (CB), 3-CB, 4-CB, 2,4-dichlorobiphenyl (DCB), 2,6DCB, 2,3,4,6-tetrachlorobiphenyl (TeCB), and 2,3,4,5,6-pentachlorobiphenyl (PeCB) were examined in serum vials with anaerobic PCB-dechlorinating methanogenic granules. These congeners contained 1-5 chlorines at different positions (ortho, meta, and para) on the biphenyl. Experimental vials with 40 ppm of each of these PCBs defined congeners were inoculated with the anaerobic PCB-dechlorinating methanogenic granules (@10 g dry weight/l) and incubated at 30° C. Samples were withdrawn periodically and analyzed for the amount of remaining congener. The experiment was conducted for 20 weeks. However, the dechlorination rates were calculated based on initial six week period which represented uniform period for all the congeners. The overall data indicated that dechlorination rates of mono- and dichlorinated (2,6-DCB) congeners were faster than some other congeners. In addition, the dechlorination of ortho chlorinated compounds such as 2-CB and 2,6-DCB was dramatically unexpected.

The above experimental results are set forth not as a limitation but rather to illustrate the complete dechlorinating capabilities of the method as well as the anaerobic PCB-dechlorinating granules (ATCC No. 55616) of the present invention.

vi. Dechlorinating Capability of Granules (ATCC No. 55616) in the Presence and Absence of Sediments Attempts were made to determine the capability of the anaerobic granules in the presence and absence of the river sediments at 30° C. A PCB congener 2,3,4,6-TeCB was used along with Aroclor 1242. In these experiments, PCB-contaminated river sediments (CRS) and granules made in accordance with the present invention were used individually and in mixture as inocula. Extensive dechlorination was observed in all these experiments. The overall dechlorinating activity of the granules were considerably increased in the presence of river sediments. This may be due to an increase in microbial population which increased the PCB dechlorination. The homolog distribution pattern after 16 weeks incubation clearly indicated the shift in the average number of chlorines per biphenyl. The homolog distribution of di-, tri-, tetra-, penta-, and hexa-chlorine per biphenyl were substantially reduced by 82, 66, 66, 63, and 90 percent respectively, after sixteen weeks of incubation in presence of granules. However, no corresponding increases of mono-or di-chlorinated congeners were observed. Similar dechlorination profiles were observed with the mixed inoculum. On the other hand, when granules were not added, a significant amount (80%) of monochlorinated congeners were still produced in presence of river sediment. These data indicate that the granules made in accordance with the present invention could carry out complete removal of all chlorines and possibly lead to biphenyl or other non-chlorinated end products which were not detected by the GC-ECD system.

vii. Dechlorinating Capability of the Granules in Lake Simulated Ecosystem

To determine the dechlorinating efficiency of the granules in natural ecosystem, an uncontaminated lake slurry which was spiked with PCBs was used as test medium. The lake water and sediment were collected from PCB-uncontaminated sites (checked with GC/ECD analysis) of Lake Michigan (Holland area). The lake water and lake sediment were mixed in the ratio of 9:1 (v/w). These experiments were conducted in serum bottles incubated at room temperature (20°-22° C.). Parallel set of control experiments were maintained using PBB medium (instead of lake water) and lake sediment mixture for the comparison of the dechlorination profiles. Experimental bottles containing Aroclor 1254 plus 2,3,4,5,6-PeCB were inoculated with the granules. No nutrients were added in either of these treatments.

Results based on the homolog distribution analysis at different intervals, revealed that the granules were able to dechlorinate PCBs extensively in lake water at room temperature. There was a shift of higher chlorinated congeners after eight weeks of incubation in both PBB medium and lake water. The extent of dechlorination of 2,3,4,5,6-PeCB in lake water was slightly higher (about 15%) than in PBB medium. However, the dechlorination patterns were the same in both cases. Accumulation of lower chlorinated congeners was perhaps due to the preferential dechlorination of higher chlorinated peaks first followed by the sequential dechlorination of the lower chlorinated congeners.

Many modifications and variations of the present invention are possible in light of the above teachings. Therefore, it is to be understood that within the scope of the appended claims, the invention may be practiced otherwise than as specifically described.

What is claimed:

1. A method of making anaerobic methanogenic PCB-dechlorinating microbial granules having all the identifying characteristics of ATCC No. 55616, said method comprising disrupting granules of methanogenic microbial consortium having the ability to dechlorinate pentachlorophenol (PCP) to form particles of about 0.1 mm or less in size and coculturing said granules with bacteria capable of dechlorinating polychlorinated biphenyls in an upflow anaerobic sludge blanket reactor on a nutrient medium until the desired granules form.

2. A method of claim 1 in which the temperature in the reactor is about 35° C.

3. A method for dechlorinating a polychlorinated biphenyl which comprises adding anaerobic methanogenic dechlorinating microbial granules having all the identifying characteristics of ATCC No. 55616 to a medium containing a polychlorinated biphenyl and culturing said granules in said medium under anaerobic conditions at a temperature of about 4° C. to about 35° C. to dechlorinate the polychlorinated biphenyl.

4. A method of claim 3, in which the medium is a member selected from a lake sediment, a river sediment and soil.

5. Anaerobic methanogenic dechlorinating microbial granules which dechlorinate polychlorinated biphenyls, said granules having all the identifying characteristics of ATCC No. 55616.

* * * * *